US007201503B2

(12) United States Patent
Amano et al.

(10) Patent No.: US 7,201,503 B2
(45) Date of Patent: Apr. 10, 2007

(54) VEHICULAR LAMP INCLUDING HEMISPHERICAL TRANSLUCENT MEMBER WITH FAN-SHAPED ZONES AND LENS ELEMENTS

(75) Inventors: Yasuyuki Amano, Shizuoka (JP); Kazunori Natsume, Shizuoka (JP); Hiroya Koizumi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 227 days.

(21) Appl. No.: 11/065,633

(22) Filed: Feb. 23, 2005

(65) Prior Publication Data

US 2005/0190564 A1 Sep. 1, 2005

(30) Foreign Application Priority Data

Feb. 26, 2004 (JP) ............................ 2004-052229

(51) Int. Cl.
*F21V 5/04* (2006.01)
*G02B 3/08* (2006.01)

(52) U.S. Cl. ...................... 362/522; 362/311; 362/336; 359/743; 359/837

(58) Field of Classification Search ................ 362/311, 362/522, 336; 359/743, 837
See application file for complete search history.

(56) References Cited

U.S. PATENT DOCUMENTS 6,340,239 B1 1/2002 Godbillon et al.

FOREIGN PATENT DOCUMENTS

JP H2-8404 2/1990
JP 2000-276910 10/2000

*Primary Examiner*—Sandra O'Shea
*Assistant Examiner*—Ismael Negron
(74) *Attorney, Agent, or Firm*—Koda & Androlia

(57) ABSTRACT

A vehicular lamp including a translucent member 14 and a light-emitting element 12 with its front being covered by the translucent member 14; a plurality of lens elements 14*s*1 and 14*s*2 being formed on the front surface 14*b* of the translucent member 14 so that the lens elements are located on a hemispherical surface which is centered upon the light-emitting element 12 and serves as a reference plane B. The front surface 14*b* of the translucent member 14 is divided in a radial pattern to form a plurality of fan-shaped zones SA and SB, which are further divided into concentric circular shapes to form a plurality of fan-shaped zone bands SA1, SA2, SA3 and SA4, and SB1, SB2 and SB3, respectively, which are provided with the lens elements 14*s*1 and 14*s*2 therein.

9 Claims, 7 Drawing Sheets

VEHICULAR LAMP INCLUDING HEMISPHERICAL TRANSLUCENT MEMBER WITH FAN-SHAPED ZONES AND LENS ELEMENTS

BACKGROUND OF THE INVENTION

1. Technical Field

The present invention relates to a vehicular lamp that uses a light-emitting element as the light source.

2. Description of the Related Art

In recent years, light-emitting elements such as light-emitting diodes are increasingly used as a light source of vehicular lamps.

For example, in the vehicular lamp disclosed in Japanese Patent Application Publication (Kokoku) No. H2-8404, a translucent member formed with a plurality of lens elements is disposed in front of a light-emitting element which is provided on the optical axis of the lamp that extends in the longitudinal direction and face the front of the lamp.

On the other hand, in the vehicular lamp disclosed in Japanese Patent Application Laid-Open (Kokai) No. 2000-276910, an incandescent bulb is used as the light source, and a translucent member is provided to cover the light source with a generally hemispherical surface shape. The central area of the translucent member is in a convex lens shape, and the plurality of lens elements are formed on the outer peripheral edge portion of the front surface. Light from the light-emitting element that passes through the translucent member and reaches the front surface is refracted by the lens elements toward the optical axis.

The vehicular lamp that uses a light-emitting element as its light source can be different in appearance from the vehicular lamp that uses an incandescent bulb as its light source. However, such a vehicular lamp is unable to obtain a very large light flux from the light source. Accordingly, with a use of a translucent member such as that described in Japanese Patent Application Laid-Open (Kokai) No. 2000-276910, it is possible to increase the light flux utilization rate for light from the light-emitting element. However, such a structure has several problems.

More specifically, in the vehicular lamp described in Japanese Patent Application Laid-Open (Kokai) No. 2000-276910, a plurality of lens elements are merely formed on the outer peripheral edge portion on the front surface of the translucent member. Accordingly, when the vehicular lamp which is unlit is viewed, the translucent member looks relatively plain so that it lacks in the novelty in design, and the appearance is not very appealing.

SUMMARY OF THE INVENTION

In view of the above, the object of the present invention is to provide a vehicular lamp that increases the light flux utilization rate for light from a light-emitting element and improves the appearance of the lamp, which uses a light-emitting element as the light source, even when it is unlit.

The present invention accomplishes the above object by installing a translucent member so that it covers the light-emitting element from the front and by devising the shape of the front surface of the translucent member.

More specifically, the above object is accomplished by a unique structure of the present invention for a vehicular lamp that includes a light-emitting element, which is provided to face the front of the lamp on the optical axis of the lamp that extends in the longitudinal direction of the lamp, and a translucent member, which is provided to cover the light-emitting element from the front side; and in the present invention, a plurality of lens elements are formed on the front surface of the translucent member with a hemispherical surface, which is centered upon the light-emitting element, serving as a reference plane, the above-described lens elements refracting light, which is from the light-emitting element and passes through the translucent member to reach the front surface, toward the optical axis, and the front surface of the translucent member is divided into a plurality of fan-shaped zones that radiate out with respect to the optical axis, and each of the fan-shaped zones is further divided into concentric circular shapes with respect to the optical axis to form a plurality of fan-shaped zone bands that are provided with the lens elements therein.

In the above structure, the "vehicular lamp" is not limited to a particular type of vehicular lamp, and it can be a tail lamp, a stop lamp or the like. The "vehicular lamp" is provided with only one set of the light-emitting element and translucent member, but it can be provided with a plurality of sets of the light-emitting element and translucent member.

The "light-emitting element" refers to a light source shaped as an element that has a light-emitting portion which emits light in a generally point shape. The type of light-emitting element is not particularly limited, and a light-emitting diode, a laser diode or the like can be employed.

The material of the "translucent member" is not particularly limited, provided that it is a material with translucency; and in addition, a member formed, for example, with transparent synthetic resin, glass or the like can be employed. Furthermore, in the present invention, the "translucent member" can be provided on the light-emitting element with an air space in between, and it can be constructed so as to be in a close contact with the light-emitting element to cover the light-emitting element.

The contour of each one of the "lens elements" is not particularly limited, provided that the lens elements are provided in each one of the fan-shaped zone bands so as to and refract light from the light-emitting element toward the optical axis.

In addition, the center angle of each of the "fan-shaped zones" and a width in the radial direction of each of the "fan-shaped zone bands" are not particularly limited in size.

As seen from the above, in the vehicular lamp of the present invention, the light-emitting element faces the front of the lamp on the lamp's optical axis that extends in the longitudinal direction of the lamp, and a translucent member is provided so as to cover the light-emitting element from the front side. Accordingly, the light flux utilization rate of light from the light-emitting element can be secured high.

Furthermore, a plurality of lens elements are formed on the front surface of the translucent member so that a hemispherical surface, which is centered upon the light-emitting element, serves as a reference plane for the translucent member, and the plurality of lens elements refract light, which is from the light-emitting element and passes through the translucent member to reach the front surface, toward the optical axis. Accordingly, light can be appropriately radiated in the lamp's forward direction.

Moreover, the front surface of the translucent member is divided into a plurality of fan-shaped zones that radiate out with respect to the optical axis, and the fan-shaped zones are further divided into concentric circular shapes with respect to the optical axis to form a plurality of fan-shaped zone bands provided with the lens elements therein. Accordingly, when the vehicular lamp is viewed when it is unlit, not only do the lens elements in the fan-shaped zones of the translucent member appear mutually independent, but each of the lens elements between adjacent fan-shaped zones appears mutually independent as well. As a result, a hemispherical shape which appears three-dimensional but in which a plurality of protrusions provided with sharp tips evokes the perception of edges is produced. Consequently, the translucent member provides a sense of novel design.

As seen from the above, according to the present invention, the lamp that uses a light-emitting element as the light source has an increased light flux utilization rate for light from the light-emitting element and an improved appearance when it is unlit.

In addition, with the employment of the above configuration, when the vehicular lamp is viewed when it is lit, the fan-shaped zone bands of the translucent member appear in a sparkling and scattered manner. Therefore, the lamp has an improved appearance as well when it is lit.

In the present invention, the boundary position of each of the fan-shaped zone bands with another fan-shaped zone band in the fan-shaped zones can be set so that it is between adjacent fan-shaped zones that are mutually offset in the radial direction. In this structure, the lens elements between adjacent fan-shaped zones appear to be even more clearly independently, so that the lamp has a further improved appearance.

The "translucent member" can be provided over the light-emitting element with an air space in between. In this structure, the back surface of the translucent member takes a hemispherical shape centered upon the light-emitting element, and this allows light from the light-emitting element to advance straight without refraction to the back of the translucent member. Thus, refraction control in the front surface of the translucent member can be easily and precisely performed.

Furthermore, in the above configuration, a plurality of prism elements can be formed on the outer peripheral edge portion of the front surface of the translucent member so that the prism elements are provided with total reflective surfaces and radiating surfaces in which the total reflective surfaces reflect light, which is from the light-emitting element and passes through the translucent member to reach the outer peripheral edge portion, toward the forward direction, and the radiating surfaces radiate light from the light-emitting element reflected by the total reflective surfaces in the forward direction. This structure is advantageous in the aspects below.

Namely, in cases where lens elements are formed up to the outer peripheral edge portion of the front surface of a translucent member, thus allowing light from the light-emitting element that reaches the lens elements to be refracted toward the optical axis in a range that does not allow total reflection, then the radiated light becomes to be radiated in a direction of a considerably large angle with respect to the optical axis of the lamp, and such light is inappropriate for use as light of a vehicular lamp. On the contrary, in the present invention, the plurality of prism elements are formed on the outer peripheral edge portion of the front surface of the translucent member, light from the light-emitting element is radiated in a direction substantially along the optical axis of the lamp by the prism elements. Accordingly, light from the light-emitting member can be used effectively as light of a vehicular lamp.

Moreover, with the use of a configuration of the present invention in which the plurality of prism elements are formed on the outer peripheral edge portion of the front surface of the translucent member, a three-dimensional appearance of the hemispherical shape evoking the perception of edges in the translucent member becomes even more prominent, so that the lamp has a further improved appearance when it is unlit.

Furthermore, a reflector can be provided on the outer circumference of the translucent member. This reflector reflects light, which is from the light-emitting element and radiated from the outer peripheral edge portion located on the outer circumference of the plurality of lens elements on the front surface of the translucent member, toward the forward direction; and the reflective surface of the reflector is formed with a plurality of reflective elements that are in a stepped configuration in the radial direction with respect to the optical axis. This structure provides the advantages as described below.

Namely, when this vehicular lamp is viewed when it is lit, the fan-shaped zone bands of the translucent member appear in a sparkling and scattered manner, and the reflective surface of the reflector also appears in a discrete manner for each reflective element. Thus, light is emitted over a wide range under specifications different from the vehicular lamp, and the lamp has a further improved appearance when it is lit.

The surface contour and spacing in the radial direction of the "reflective elements" are not particularly limited, provided that the reflective elements are formed in a stepped configuration in the radial direction with respect to the optical axis. Furthermore, each of the "reflective elements" can be formed in a divided fashion in the circumferential direction with respect to the optical axis or formed in a toric shape.

In the above structure, the cross-sectional shape inclusive of the optical axis for the outer peripheral edge portion of the front surface of the translucent member can be a generally circular curved shape whose curvature is greater than the hemispherical surface that serves as a reference plane. This configuration allows light radiated from the outer peripheral edge portion to easily reach the reflective surface of the reflector as substantially parallel light within a cross section inclusive of the optical axis of the lamp. An effective utilization of light flux from the light source is thus assured.

DETAILED DESCRIPTION OF THE INVENTION

Hereinafter, embodiments of the present invention will be described with reference to the accompanying drawings.

The first embodiment of the present invention will be described first.

Figure 1:
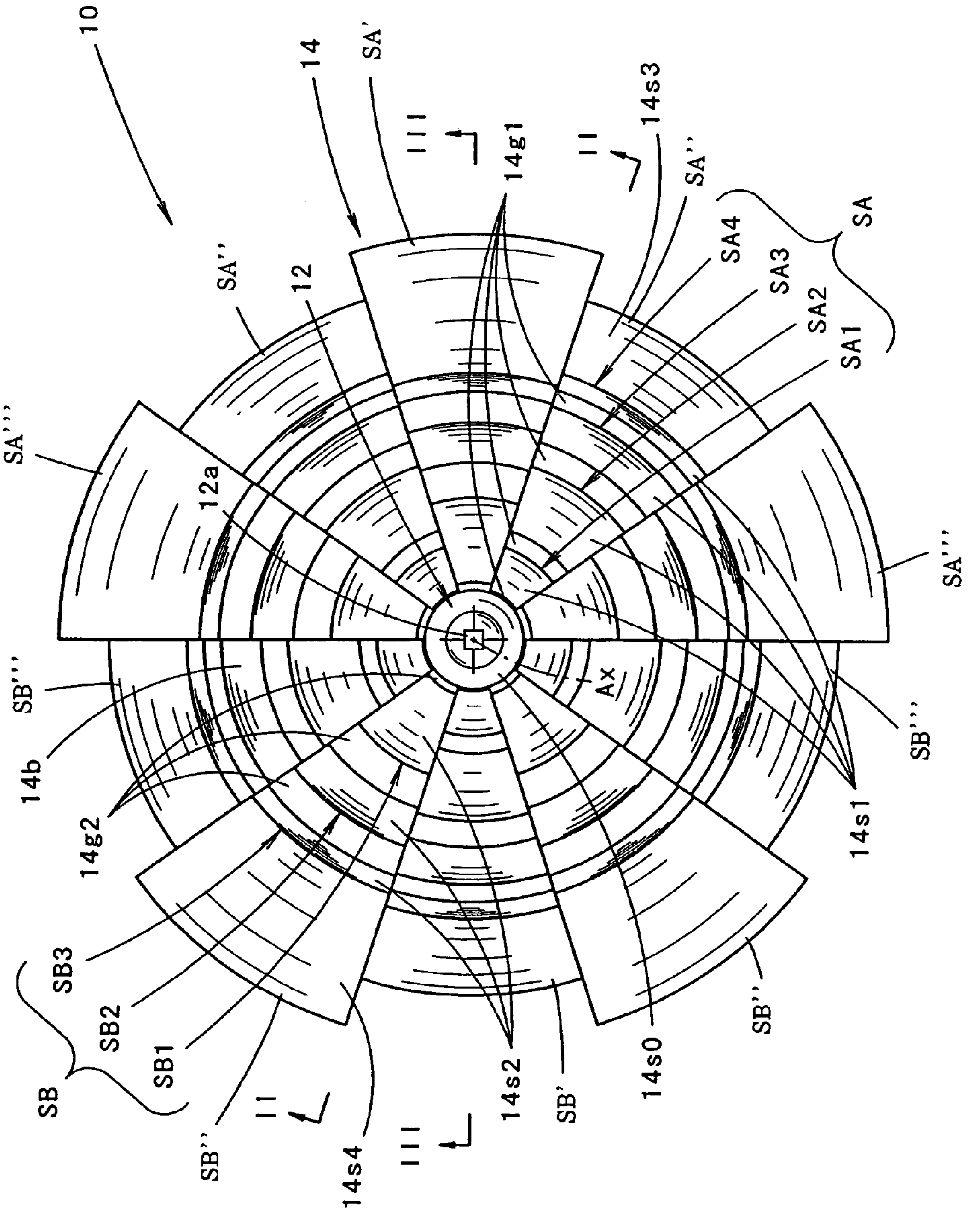
FIG. 1 is a front elevational view of the vehicular lamp according to the first embodiment of the present invention.
Figure 2:
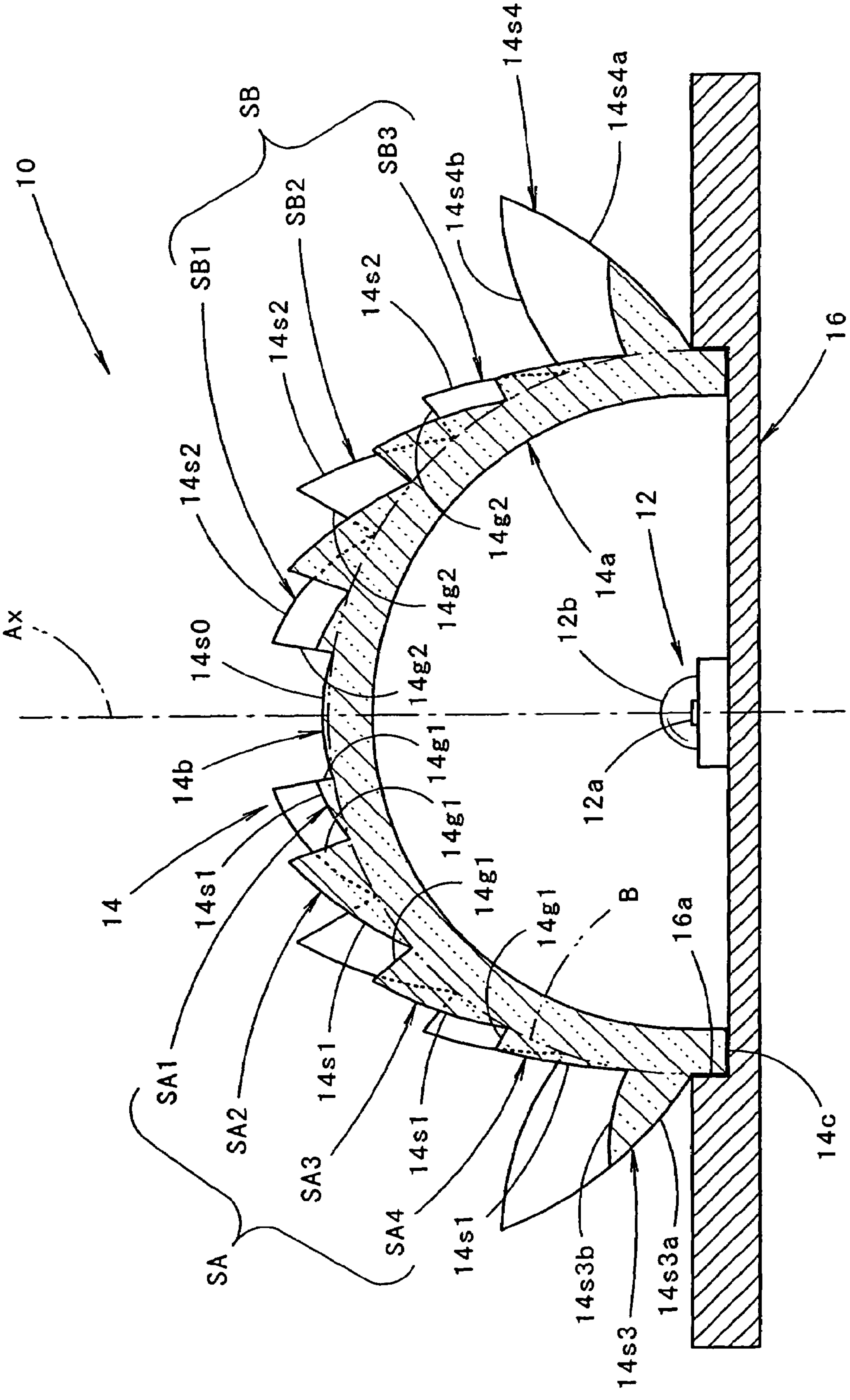
FIG. 2 is a cross-sectional view taken along the line II—II in FIG. 1.
Figure 3:
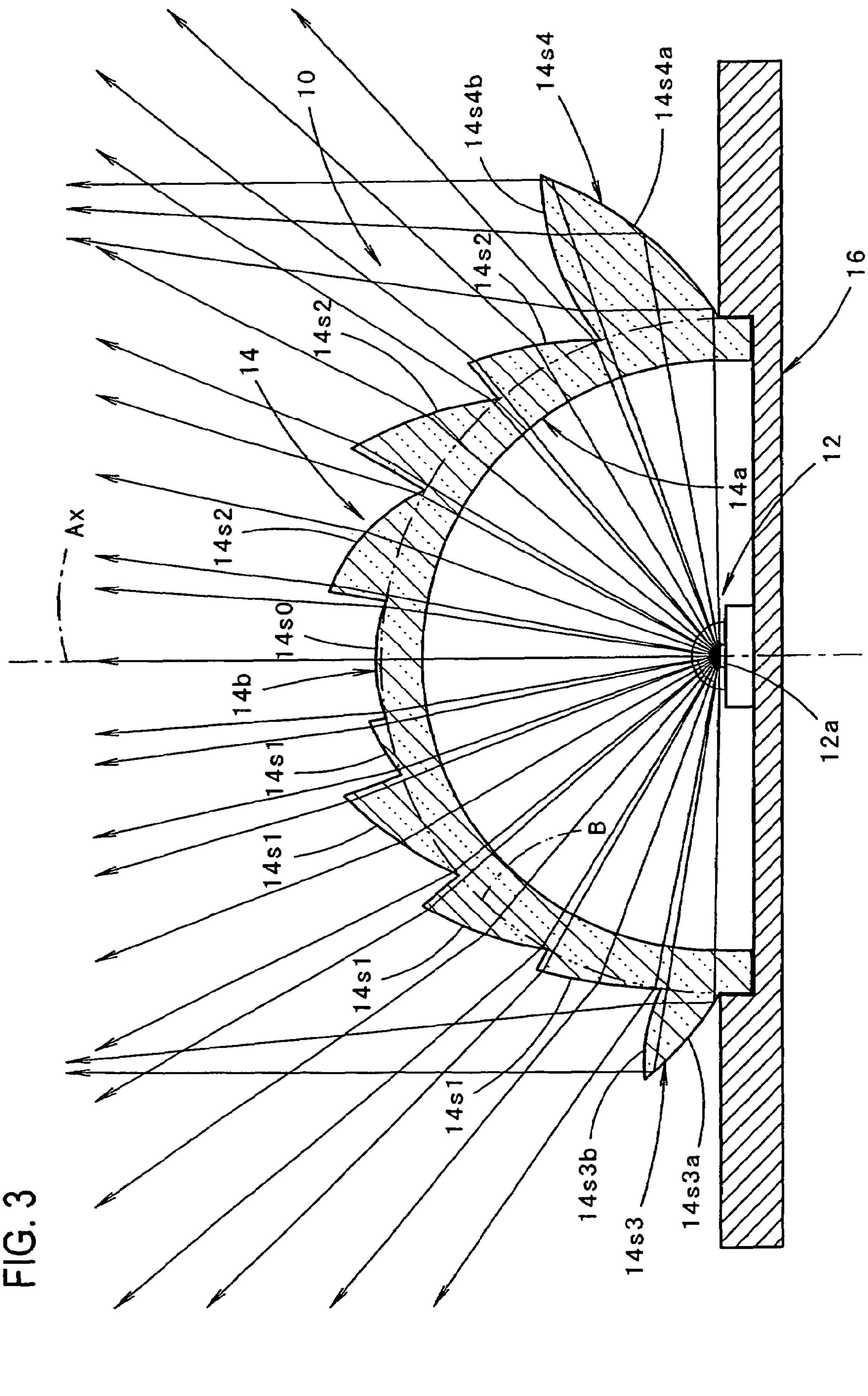
FIG. 3 is a cross-sectional view taken along the line III—III in FIG. 1.

As shown in FIGS. 1 through 3, the vehicular lamp 10 of the first embodiment is a tail lamp attached to the rear end of a vehicle. The vehicular lamp 10 is comprised of a light-emitting element 12 and a translucent member 14. The optical axis Ax of the lamp 10 extends in the longitudinal direction of the lamp (or of the vehicle).

The light-emitting element 12 is a red light-emitting diode, and the light-emitting chip 12*a* approximately 0.3 to 1 $mm^2$ in size is covered by a sealing resin 12*b* that has a hemispherical shape. The light-emitting element 12 is fixed to a support plate 16 so that the light-emitting chip 12*a* faces the front of the lamp (in other words the "rear" of the vehicle) on the optical axis Ax of the lamp.

The translucent member 14 is made of synthetic resins and is formed into a dome shape. The translucent member 14 covers the light-emitting element 12 from the front side. The rear end surface 14*c* of the translucent member 14 is fixed to the support plate 16. The region near the rear end surface 14*c* is fitted in a concave portion 16*a* of the support plate 16, so that the positioning of the translucent member 14 in a radial direction with respect to the optical axis Ax is assured.

The back surface 14*a* of the translucent member 14 is in a hemispherical shape having its center on the light-emitting element 12 (more precisely, the back surface 14*a* has a hemispherical shape with its center being on the center of light emitted from the light-emitting chip 12*a*).

A plurality of lens elements 14*s*0, 14*s*1 and 14*s*2 are formed on the front surface 14*b* of the translucent member 14, except for the outer peripheral edge, in such a manner that a hemispherical surface centered upon the light-emitting element 12 serves as a reference plane B (see FIG. 2). The plurality of lens elements 14*s*0, 14*s*1 and 14*s*2 refract light, which is from the light-emitting element 12 and passes through the translucent member 14 to reach the front surface 14*b*, toward the optical axis Ax.

Of the plurality of lens elements 14*s*0, 14*s*1 and 14*s*2, the lens element 14*s*0 located on the optical axis Ax has a small circular zone having its center on the optical axis Ax. For the remaining lens elements 14*s*1 and 14*s*2, the front surface 14*b* of the translucent member 14 is divided into a plurality of isometric fan-shaped zones SA and SB (ten in the shown embodiment, or five zones SA and five zones SB) that radiate out with respect to the optical axis Ax, which are further divided into isometric and concentric circular shapes with respect to the optical axis Ax and centered upon the light-emitting element 12 to form a plurality of fan-shaped zone bands SA1, SA2, SA3 and SA4, and SB1, SB2 and SB3, respectively, provided with the lens elements 14*s*1 and 14*s*2 therein.

In the above structure, as seen from FIG. 1, the boundary position of each of the fan-shaped zone bands SA1, SA2, SA3 and SA4, and SB1, SB2 and SB3 with another fan-shaped zone band in the fan-shaped zones SA and SB (or the boundary position between the fan-shaped zone bands SA1, SA2, SA3 and SA4, and SB1, SB2 and SB3 in the fan-shaped zones SA and SB next to each other) is set to be between adjacent fan-shaped zones SA and SB that are mutually offset by half a pitch in the radial direction. In order to achieve this configuration, the center angle in the radial direction of the fan-shaped zone band SA1 positioned on the innermost location of the fan-shaped zone SA is set to half the value of that for the other fan-shaped zone bands SA2, SA3, SA4, SB1, SB2 and SB3.

The lens elements 14*s*0, 14*s*1 and 14*s*2 that make the front surface 14*b* of the translucent member 14 are substantially in a Fresnel lens shape; and they refract light, which is from the light-emitting element 12 and passes through the translucent member 14 to reach the front surface 14*b*, toward the optical axis Ax.

More specifically, the lens element 14*s*0 is in a generally spherical shape whose surface contour has a curvature somewhat greater than the reference plane B of the front surface 14*b*.

Each lens element 14*s*1 is formed in a serrated shape through a stepped portion 14*g*1, whose surface contour has a curvature somewhat greater than the reference plane B. In this configuration, the height of each stepped portion 14*g*1 is set so that the angle, which is formed by the light radiated from each of the lens elements 14*s*1 and the optical axis Ax, gradually increases in accordance with the distance of the fan-shaped zone bands from the optical axis Ax in the order of SA1→SA2→SA3→SA4.

Likewise, each lens element 14*s*2 is formed in a serrated shape through a stepped portion 14*g*2, whose surface contour has a curvature somewhat greater than the reference plane B. In this configuration, the height of each stepped portion 14*g*2 is set such that the angle, which is formed by the light radiated from each of the lens elements 14*s*2 and the optical axis Ax, gradually increases in accordance with the distance of the fan-shaped zone bands from the optical axis Ax in the order of SB1→SB2→SB3.

For one pair of fan-shaped zones SA' and SB' positioned on the right and left sides of the optical axis Ax among the ten fan-shaped zones SA and SB, the height of the stepped portions 14*g*1 and 14*g*2 is set to be a relatively small value; for two pairs of fan-shaped zones SA" and SB" adjacent on both top and bottom sides of the fan-shaped zones SA' and SB', the height of the stepped portions 14*g*1 and 14*g*2 is set to an intermediate value; and for the remaining two pairs of fan-shaped zones SA'" and SB'" adjacent on both top and bottom sides of the fan-shaped zones SA" and SB", the height of the stepped portions 14*g*1 and 14*g*2 is set to be a relatively large value. Thus, the diffusion angle in a vertical direction is set to be smaller than the diffusion angle in the lateral direction, so that the light distribution pattern, which is formed by light radiated forward from the vehicular lamp 10, is in a horizontally oblong shape.

A plurality of prism elements 14*s*3 and 14*s*4 are formed on the outer peripheral edge portion of the front surface 14*b* of the translucent member 14. The prism elements 14*s*3 are provided in the fan-shaped zones SA, and the prism elements 14*s*4 are provided in the fan-shaped zones SB. Furthermore, the center angle in the radial direction for the prism elements 14*s*3 is set to be half that for the prism elements 14*s*4.

The prism elements 14*s*3 and 14*s*4 are respectively provided with total reflective surfaces 14*s*3*a* and 14*s*4*a* that totally reflect light, which is from the light-emitting element 12 and passes through the translucent member 14 to reach the outer peripheral edge portion of the front surface 14*b*, and radiating surfaces 14*s*3*b* and 14*s*4*b* that radiate light, which is from the light-emitting element 12 and reflected by the total reflective surfaces 14*s*3*a* and 14*s*4*a*, in the forward direction. The surface contour of the total reflective surfaces 14*s*3*a* and 14*s*4*a* is set to be a paraboloid shape that has the optical axis Ax as its central axis and has the center position of light emission of the light-emitting element 12 as its focal point; and the surface contour of the radiating surfaces 14*s*3*b* and 14*s*4*b* is set to be a generally spherical shape. As a result, the prism elements 14*s*3 and 14*s*4 radiate light from the light-emitting element 12 in a direction along the optical axis Ax, so that the light is first converged and then diffused.

As described above, in the vehicular lamp 10 of the shown embodiment, the light-emitting element 12 is provided to face the front of the lamp on the optical axis Ax that extends in the longitudinal (or the depth) direction of the lamp, and the translucent member 14 is provided so that it covers the light-emitting element 12 from the front side of the light-emitting element 12. Accordingly, the lamp has an increased light flux utilization rate for the light from the light-emitting element 12, In addition, the plurality of lens elements 14*s*0, 14*s*1 and 14*s*2 are formed on the front surface 14*b* of the translucent member 14 in such a manner that a hemispherical surface centered upon the light-emitting element 12 serves as a reference plane B for the lens elements 14*s*0, 14*s*1 and 14*s*2; and these plurality of lens elements 14*s*), 14*s*1 and 14*s*2 refract light, which is from the light-emitting element 12 and passes through the translucent member 14 to reach the front surface 14*b*, toward the optical axis Ax. Thus, irradiation of light in the forward direction of the lamp can be performed appropriately.

Furthermore, the front surface 14*b* of the translucent member 14 is divided into the plurality of fan-shaped zones SA and SB that radiate out with respect to the optical axis Ax, which are further divided into concentric circular shapes with respect to the optical axis Ax to form the plurality of fan-shaped zone bands SA1, SA2, SA3 and SA4, and SB1, SB2 and SB3, respectively, provided with the lens elements 14*s*1 and 14*s*2 among the plurality of lens elements 14*s*0, 14*s*1 and 14*s*2 therein. Therefore, when the vehicular lamp 10 is viewed when it is unlit, not only do the lens element 14*s*0 provided in the circular zone on the optical Ax and the lens elements 14*s*1 and 14*s*2 in the fan-shaped zones SA and SB of the translucent member 14 appear mutually independent, but each of the lens elements 14*s*1 and 14*s*2 between adjacent fan-shaped zones SA and SB appears mutually independent as well. As a result, a hemispherical shape that appears three-dimensionally with a plurality of protrusions provided with sharp tips evokes the perception of edges. Consequently, the translucent member 14 provides a sense of novel design.

As described above, according to the above embodiment, it is possible to increase the light flux utilization rate for light from the light-emitting element 12 and improve the unlit appearance of the lamp.

Furthermore, in the above-described embodiment, the vehicular lamp 10 looks, when it is lit, so that the circular zone and fan-shaped zone bands SA1, SA2, SA3 and SA4, and SB1, SB2 and SB3 of the translucent member 14 appear in a sparkling and scattered fashion. Accordingly, the lamp has an improved lit appearance as well.

In addition, in the above described embodiment, the boundary position of each of the fan-shaped zone bands SA1, SA2, SA3 and SA4, and SB1, SB2 and SB3 with another fan-shaped zone band in the fan-shaped zones SA and SB is set so that it is between adjacent fan-shaped zones SA and SB that are mutually offset in the radial direction. Accordingly, the lens elements 14*s*1 and 14*s*2 between adjacent fan-shaped zones SA and SB appear to be even more clearly independently, thus further improving the appearance of the vehicular lamp 10.

In the above embodiment, the boundary of each of the fan-shaped zone bands SA1, SA2, SA3 and SA4, and SB1, SB2 and SB3 with another fan-shaped zone band is set to be an isometric position centered upon the light-emitting element 12, and the boundary position between the adjacent fan-shaped zones SA and SB is offset by half a pitch in the radial direction. Accordingly, the lens elements 14*s*1 and 14*s*2 appear to be even more clearly independently.

In addition, in the above embodiment, the back surface of the translucent member 14 is in a hemispherical shape centered upon the light-emitting element 12, so that light from the light-emitting element 12 can advance straight without refraction to the back surface 14*a* of the translucent member 14. Thus, refraction control in the front surface 14*b* of the translucent member 14 can be easily and precisely performed.

Furthermore, in the above embodiment, the plurality of prism elements 14*s*3 and 14*s*4 are formed on the outer peripheral edge portion of the front surface 14*b* of the translucent member 14; and the prism elements 14*s*3 and 14*s*4 are respectively provided with the total reflective surfaces 14*s*3*a* and 14*s*4*a* that reflect light, which is from the light-emitting element 12 and passes through the translucent member 14 to reach the outer peripheral edge portion, toward the forward direction, and the radiating surfaces 14*s*3*b* and 14*s*4*b* that radiate light, which is from the light-emitting element 12 and reflected by the total reflective surfaces 14*s*3*a* and 14*s*4*a*, in the forward direction. With this construction, the lamp of the present invention has the advantages described below.

Namely, in cases where the lens elements 14*s*1 and 14*s*2 are formed up to the outer peripheral edge portion of the front surface 14*b* of the translucent member 14, thus allowing light from the light-emitting element 12 that reaches the lens elements 14*s*1 and 14*s*2 to be refracted toward the optical axis Ax in a range that does not allow total reflection, then the radiated light would be radiated in the direction of a considerably large angle with respect to the optical axis Ax, and such light is inappropriate for use as light of the vehicular lamp 10. To the contrary, in the above embodiment of the present invention, the prism elements 14*s*3 and 14*s*4 are formed on the outer peripheral edge portion of the front surface 14*b* of the translucent member 14; accordingly, light from the light-emitting element 12 is radiated in a direction substantially along the optical axis Ax by the prism elements 14*s*3 and 14*s*4. Thus, light from the light-emitting element can be effectively utilized as light of a vehicular lamp.

Moreover, with the structure in which the plurality of prism elements 14*s*3 and 14*s*4 are formed on the outer peripheral edge portion of the front surface 14*b* of the translucent member 14, a three-dimensional appearance of the hemispherical shape evoking the perception of edges in the translucent member 14 becomes even more prominent, so that the lamp has an improved appearance when it is lit.

The second embodiment of the present invention will be described next.

Figure 4:
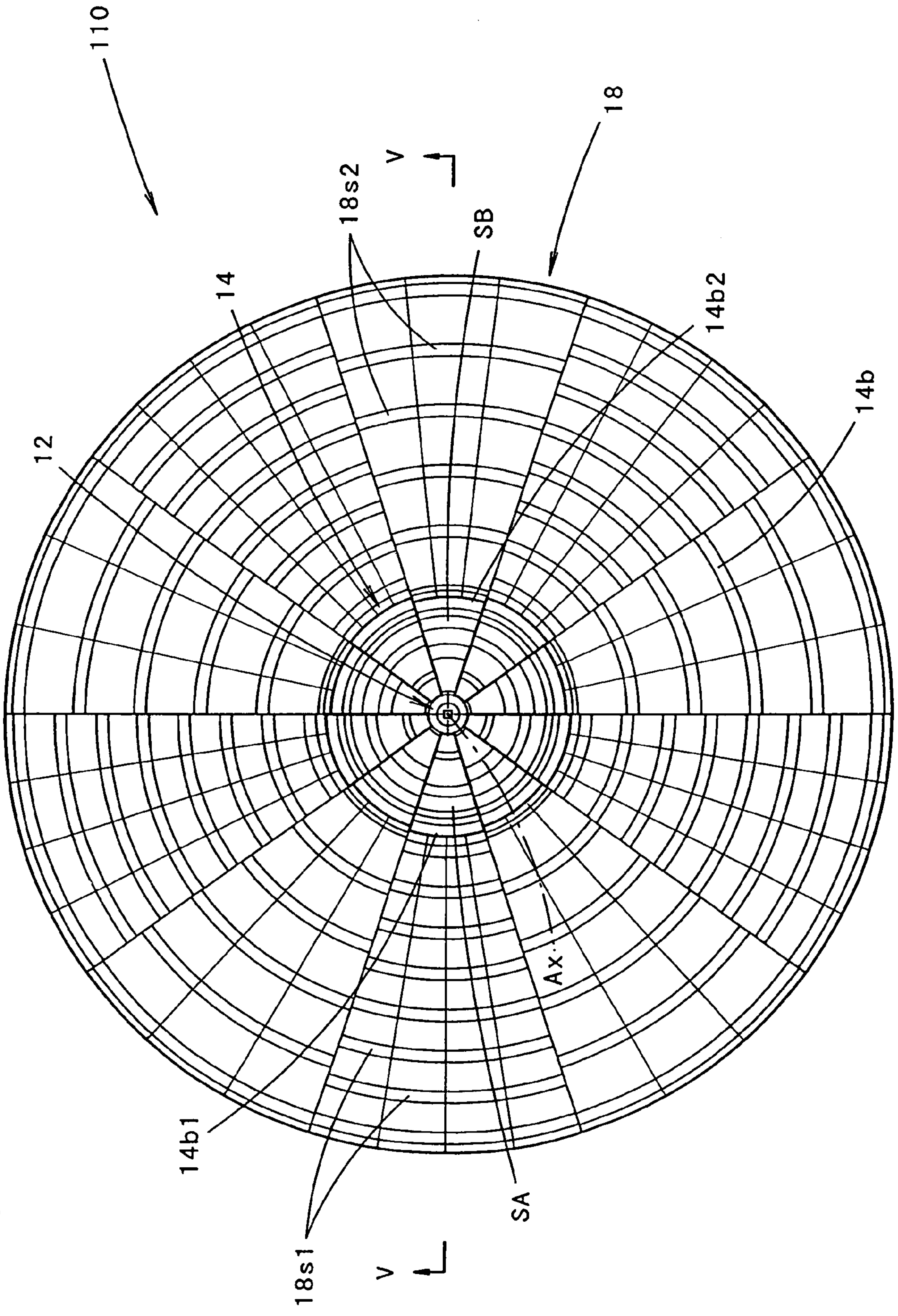
FIG. 4 is a front elevational view of the vehicular lamp according to the second embodiment of the present invention.
Figure 5:
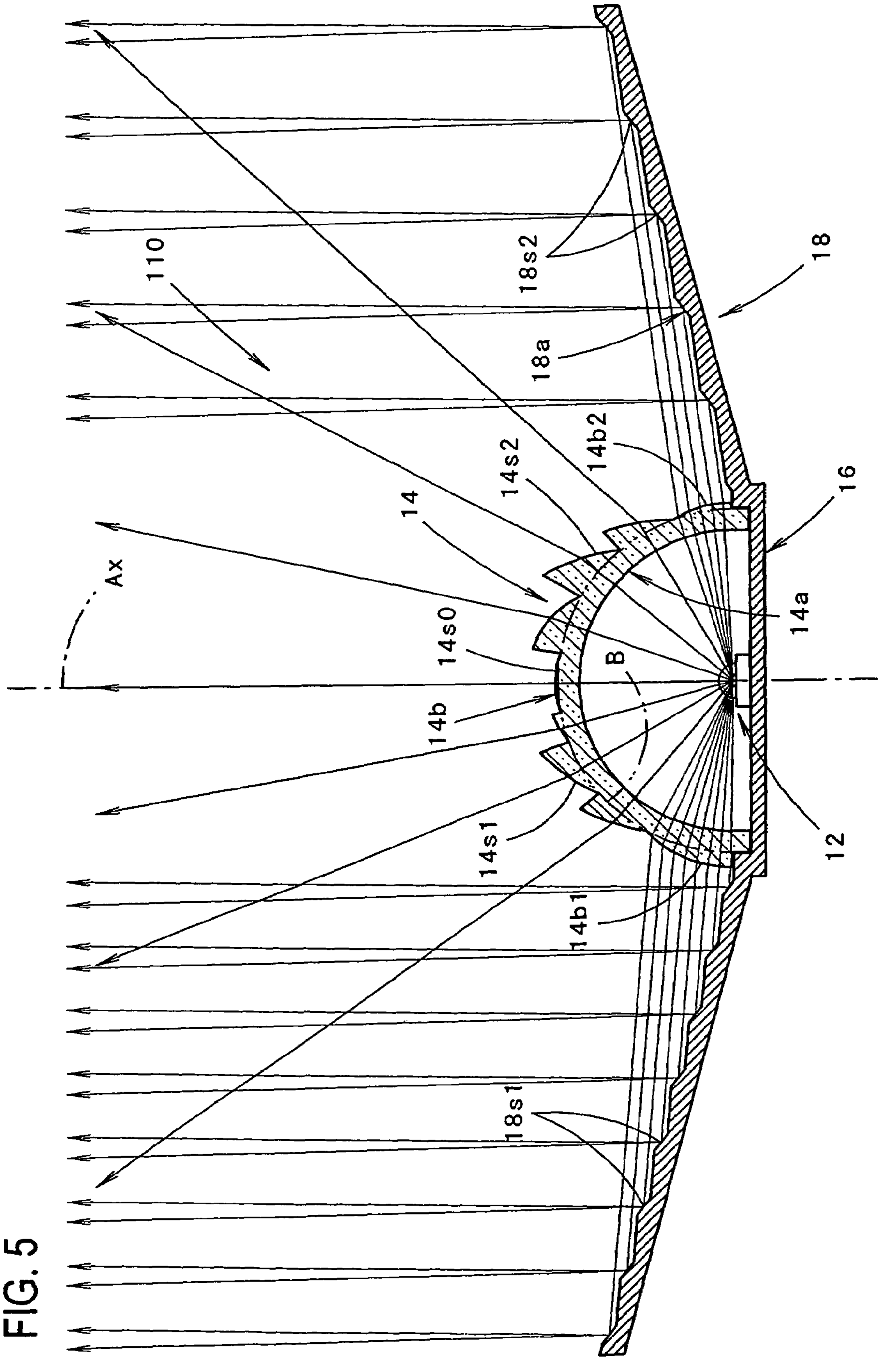
FIG. 5 is a cross-sectional view taken along the line V—V in FIG. 4.

FIG. 4 shows a vehicular lamp 110 of the second embodiment, and FIG. 5 is a cross-sectional view thereof.

As seen from FIGS. 4 and 5, the vehicular lamp 110 is completely identical to the that of the above-described first embodiment in regards to the configuration of the plurality of lens elements 14*s*0, 14*s*1 and 14*s*2 in the translucent member 14 and the light-emitting element 12, but the vehicular lamp 110 differs from that of the first embodiment in that a reflector 18 is provided on the outer circumference of the translucent member 14.

Furthermore, in this second embodiment, a plurality of prism elements 14*s*3 and 14*s*4 are not formed as in the first embodiment on the outer peripheral edge portions 14*b*1 and 14*b*2 of the front surface 14*b* of the translucent member 14. Instead, a cross-sectional shape of the outer peripheral edge portions 14*b*1 and 14*b*2 inclusive of the optical axis Ax is set so that it has a generally circular curved shape whose curvature is greater than the reference plane B. Thus, light radiated from the outer peripheral edge portions 14*b*1 and 14*b*2 reaches the reflective surface 18*a* of the reflector 18 as substantially parallel light within a cross section inclusive of the optical axis Ax.

The reflector 18 is formed so that the support plate 16 extends toward the outer circumference, and its reflective surface 18*a* is formed from a plurality of reflective elements 18*s*1 and 18*s*2, which are in a stepped configuration in the radial direction with respect to the optical axis Ax. With the use of these reflective elements 18*s*1 and 18*s*2, it is possible to allow light, which is from the light-emitting element 12 and is radiated from the outer peripheral edge portions 14*b*1 and 14*b*2 positioned on the outer circumference of the plurality of lens elements 14*s*1 and 14*s*2 on the front surface 14*b* of the translucent member 14, to be reflected toward the forward direction.

The surface contour of the reflective elements 18*s*1 and 18*s*2 is set to be a curved shape in which a slight curvature is added to a conic surface that has a central axis on the optical axis Ax. In this case, each conic surface takes a conic shape that has an apex angle at which light radiated from the outer peripheral edge portions 14*b*1 and 14*b*2 is reflected parallel to the optical axis Ax. Thus, the reflective elements 18*s*1 and 18*s*2 reflect light radiated from the outer peripheral edge portions 14*b*1 and 14*b*2 of the front surface 14*b* of the translucent member 14 forward in a diffused manner along the optical axis Ax.

Among the plurality of reflective elements 18*s*1 and 18*s*2, the reflective elements 18*s*1 are provided on the outer circumference of the fan-shaped zones SA, and the reflective elements 18*s*2 are provided on the outer circumference of the fan-shaped zones SB. In addition, the reflective elements 18*s*1 provided on the outer circumference of the fan-shaped zones SA are formed into eight steps in the radial direction and divided into four parts in the circumferential direction. In addition, the reflective elements 18*s*2 provided on the outer circumference of the fan-shaped zones SB are formed into six steps in the radial direction and divided into three parts in the circumferential direction.

In the lamp configuration of this second embodiment, when the vehicular lamp 110 is viewed when it is lit, the fan-shaped zone bands of the translucent member 14 appear in a sparkling and scattered manner, and the reflective surface 18*a* of the reflector 18 also appears in a discrete manner for each reflective element 18*s*1 and 18*s*2. Thus, light is emitted over a wide range under different specifications for the vehicular lamp 10, and the lamp has an improved lit appearance.

Furthermore, in the lamp of the second embodiment, the cross-sectional shape inclusive of the optical axis Ax of the outer peripheral edge portions 14*b*1 and 14*b*2 of the front surface 14*b* of the translucent member 14 is set to be a generally circular curved shape that has a curvature greater than that of the reference plane B. Therefore, light radiated from the outer peripheral edge portions 14*b*1 and 14*b*2 can easily reach the reflective surface 18*a* of the reflector 18 as substantially parallel light within a cross section inclusive of the optical axis Ax, thus assuring effective utilization of light flux from the light source.

The third embodiment of the present invention will be described next.

Figure 6:
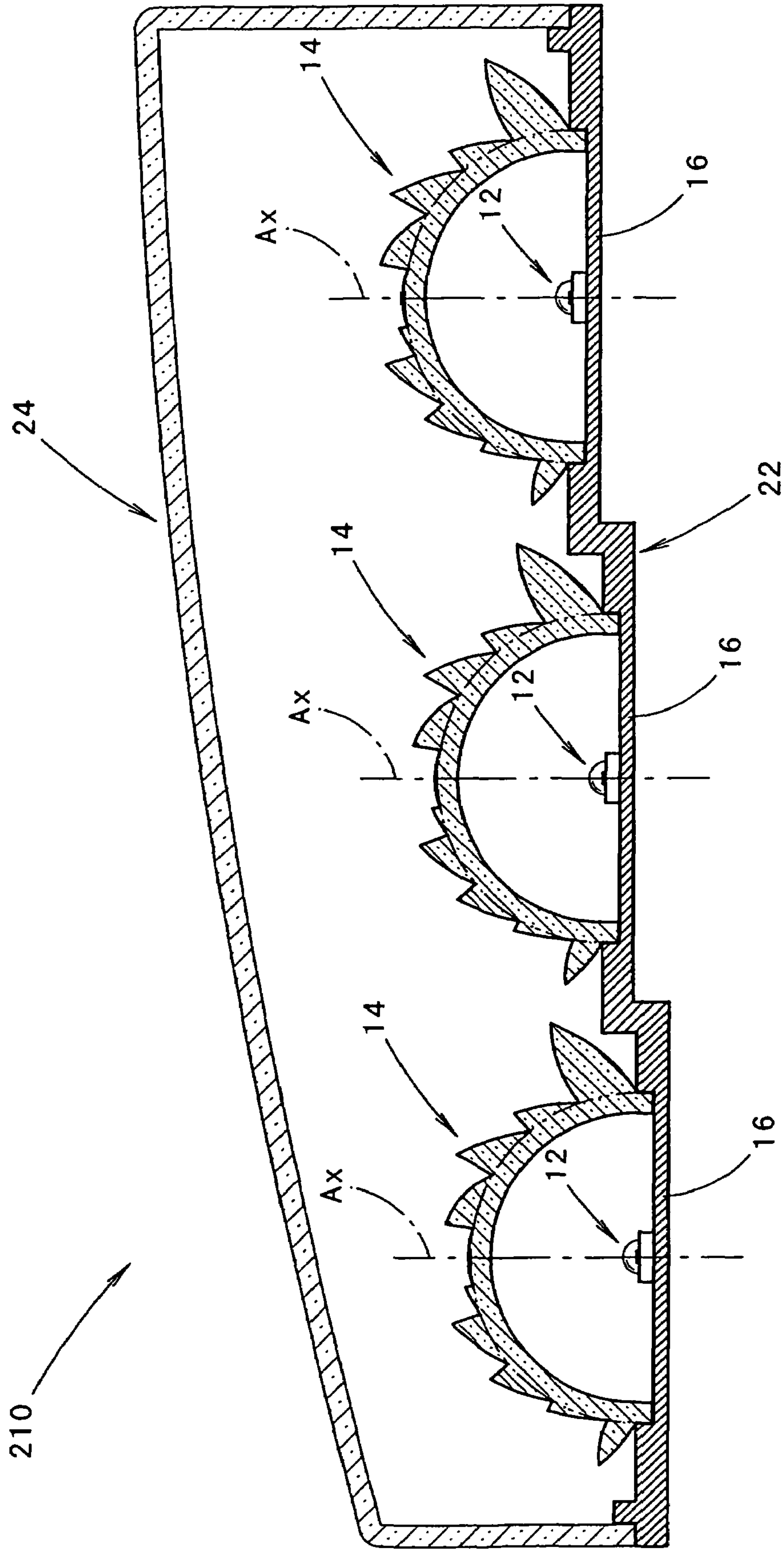
FIG. 6 is a cross-sectional view of the vehicular lamp according to the third embodiment of the present invention.

FIG. 6 shows a vehicular lamp 210 of the third embodiment.

As seen from FIG. 6, the vehicular lamp 210 is a tail lamp attached to the right side of the rear end of a vehicle, and it has a configuration that three groups of the light-emitting element 12 and the translucent member 14 are accommodated with predetermined spaces in between in the horizontal direction inside a lamp chamber formed by a lamp body 22 and a substantially plain translucent cover 24 attached to the lamp body 22.

In this third embodiment, the configuration of the light-emitting element 12 and the translucent member 14 in each group is completely identical to that in the lamp of the first embodiment.

In the third embodiment, the support plate 16 for each group is integrally formed in a stepped shape, thus forming the lamp body 22.

By employing a lamp configuration of this third embodiment in which the translucent member 14, which appears three-dimensionally and is provided with a plurality of protrusions with sharp tips that evoke the perception of edges, is provided in a plurality of locations, the translucent member 14 provides an even stronger sense of novel design.

The fourth embodiment of the present invention will be described next.

Figure 7:
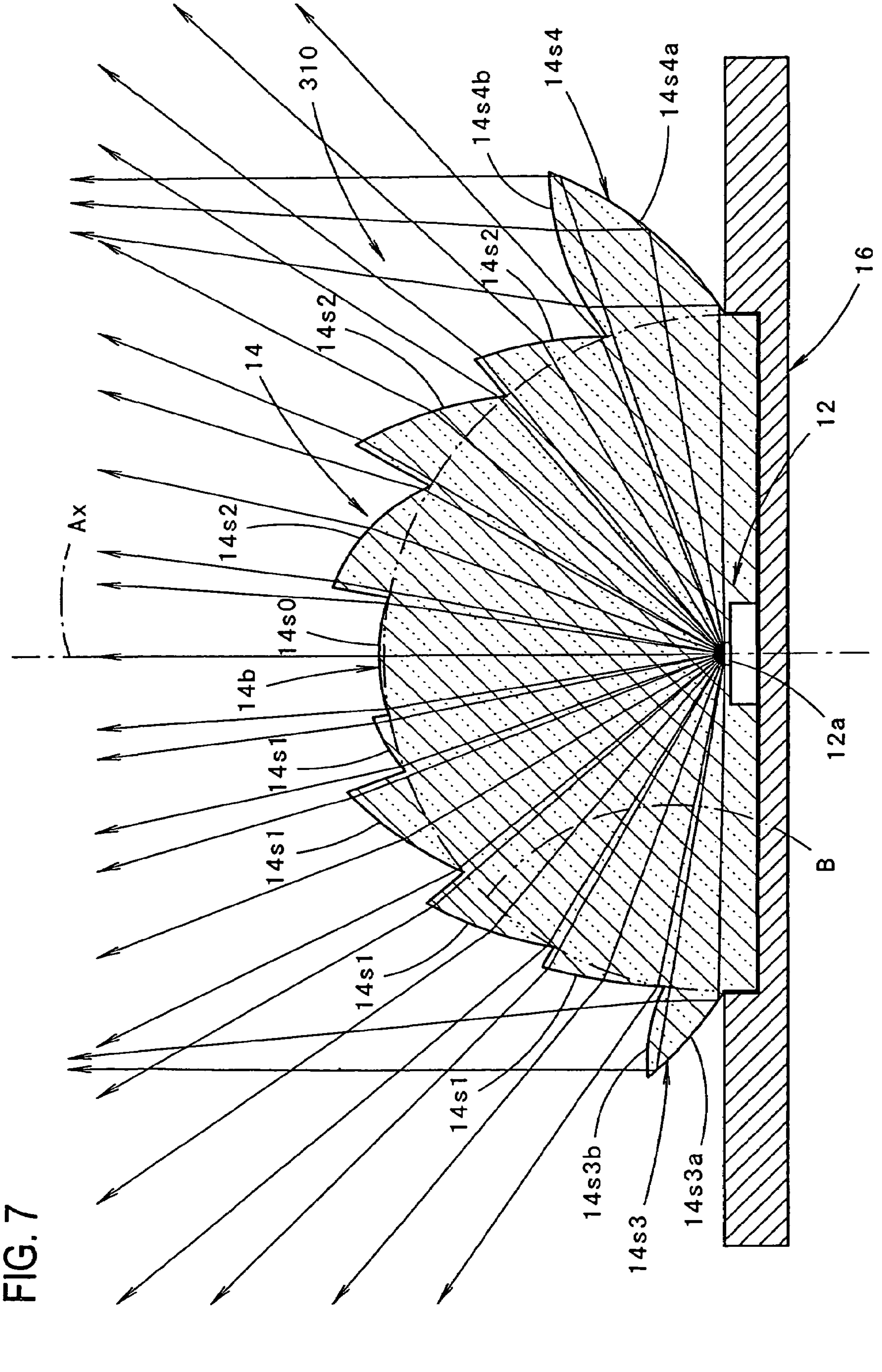
FIG. 7 is a cross-sectional view of the vehicular lamp according to the fourth embodiment of the present invention.

FIG. 7 shows a vehicular lamp 310 of the fourth embodiment.

As seen from FIG. 7, the basic configuration of the vehicular lamp 310 is completely identical to that in the first embodiment. The vehicular lamp 310 of the fourth embodiment differs from that of the first embodiment in that the translucent member 14 is in contact with the light-emitting element 12 and structured from a block-shaped member formed to cover the light-emitting element 12.

More specifically, in the lamp of the fourth embodiment, the light-emitting chip 12*a* of the light-emitting element 12 is directly sealed by the translucent member 14.

With the employment of the configuration of the fourth embodiment, it is also possible to increase the light flux utilization rate for light from the light-emitting element 12 and improve the appearance of the lamp when it is lit.

By allowing the translucent member 14 to directly seal the light-emitting chip 12*a* as in this fourth embodiment, the translucent member 14 functions as a sealing resin. Thus, the lamp unit 310 has a simplified configuration, and losses in light flux due to the surface reflection of light from the light-emitting element 12 upon reaching the translucent member 14 can be eliminated.

Instead of the above structure, it is possible to employ a configuration in which the sealing resin 12*b* of the light-emitting element 12 is sealed by the translucent member 14. In this structure as well, losses in light flux due to the surface reflecting of light from the light-emitting element 12 upon reaching the translucent member 14 can be eliminated.

In each one of the above-described embodiments, the front surface 14*b* of the translucent member 14 is divided into ten isometric fan-shaped zones SA and SB that radiate out with respect to the optical axis Ax. However, configurations other than ten divisions can be made, and configurations in which divisions are made at mutually different angles are also possible. Furthermore, in the above embodiments, the fan-shaped zones SA and SB are divided into a plurality of fan-shaped zone bands SA1, SA2, SA3 and SA4, and SB1, SB2 and SB3 which are centered upon the light-emitting element 12 and have isometric and concentric circular shapes with respect to the optical axis Ax. However, a configuration in which divisions of the front surface of the translucent member are made at mutually different angles is also possible.

In addition, in the above embodiments, the vehicular lamps 10, 110, 210 and 310 are tail lamps. However, similar effects can be obtained when employing a configuration similar to that in the above embodiments in other types of vehicular lamps (including, for example, a stop lamp, a tail and stop lamp, a clearance lamp, and a turn signal lamp) as well.

The invention claimed is:

1. A vehicular lamp comprising:

a light-emitting element positioned on an optical axis of the lamp to face toward a front of the lamp;

a translucent member covering the light-emitting element from a front side thereof, and having an hemispherical front surface serving as a reference plane, wherein:

a plurality of fan-shaped zones that radiate out from the optical axis are formed on the front surface of the translucent member each of said fan-shaped zones is further divided into concentric circular shapes with respect to said optical axis, forming a plurality of fan-shaped zone bands;

a lens element formed on each one of said fan-shaped zone bands and having a hemispherical surface, said lens element refracting light from said light-emitting element toward said optical axis.

2. The vehicular lamp according to claim 1, wherein a boundary between adjacent fan-shaped zone bands is set to be mutually offset in a radial direction.

3. The vehicular lamp according to claim 1 or 2, further comprising:

a plurality of prism elements formed on an outer peripheral edge portion of the front surface of the translucent member, said prism elements comprising a total reflective surface and a radiating surface wherein the total reflective surface totally reflects light from the light-emitting element in a forward direction, and the radiating surface radiates light from the light-emitting element reflected by the total reflective surface in the forward direction.

4. The vehicular lamp according to claim 1 or 2, further comprising:

a reflector provided on an outer circumference of the translucent member to reflect light from the light-emitting element and radiated from the outer peripheral edge portion of the front surface of the translucent member, in the forward direction, wherein a reflective surface of the reflector comprises a plurality of reflective elements formed in a stepped configuration in a radial direction with respect to the optical axis.

5. The vehicular lamp according to claim 4, wherein in a cross-section of the translucent member including the optical axis, the outer peripheral edge portion of the translucent member is set to be a generally circular curved shape whose curvature is greater than said reference plane.

6. The vehicular lamp according to claim 1 or 2, wherein a shape of a back surface of the translucent member is set to be a hemispherical shape centered upon the light-emitting element.

7. The vehicular lamp according to claim 6, further comprising:

a plurality of prism elements formed on an outer peripheral edge portion of the front surface of the translucent member, said prism elements comprising a total reflective surface and a radiating surface wherein the total reflective surface totally reflects light from the light-emitting element in a forward direction, and the radiating surface radiates light from the light-emitting element reflected by the total reflective surface in the forward direction.

8. The vehicular lamp according to claim 6, further comprising:

a reflector provided on an outer circumference of the translucent member to reflects light from the light-emitting element and radiated from the outer peripheral edge portion of the front surface of the translucent member, in the forward direction, wherein a reflective surface of the reflector comprises a plurality of reflective elements formed in a stepped configuration in a radial direction with respect to the optical axis.

9. The vehicular lamp according to claim 8, wherein in a cross-section of the translucent member including the optical axis, the outer peripheral edge portion of the translucent member is set to be a generally circular curved shape whose curvature is greater than said reference plane.

* * * * *